March 11, 1947.  L. F. THIRY  2,417,096
FLUID-DAMPED MOUNTING
Filed Dec. 13, 1944
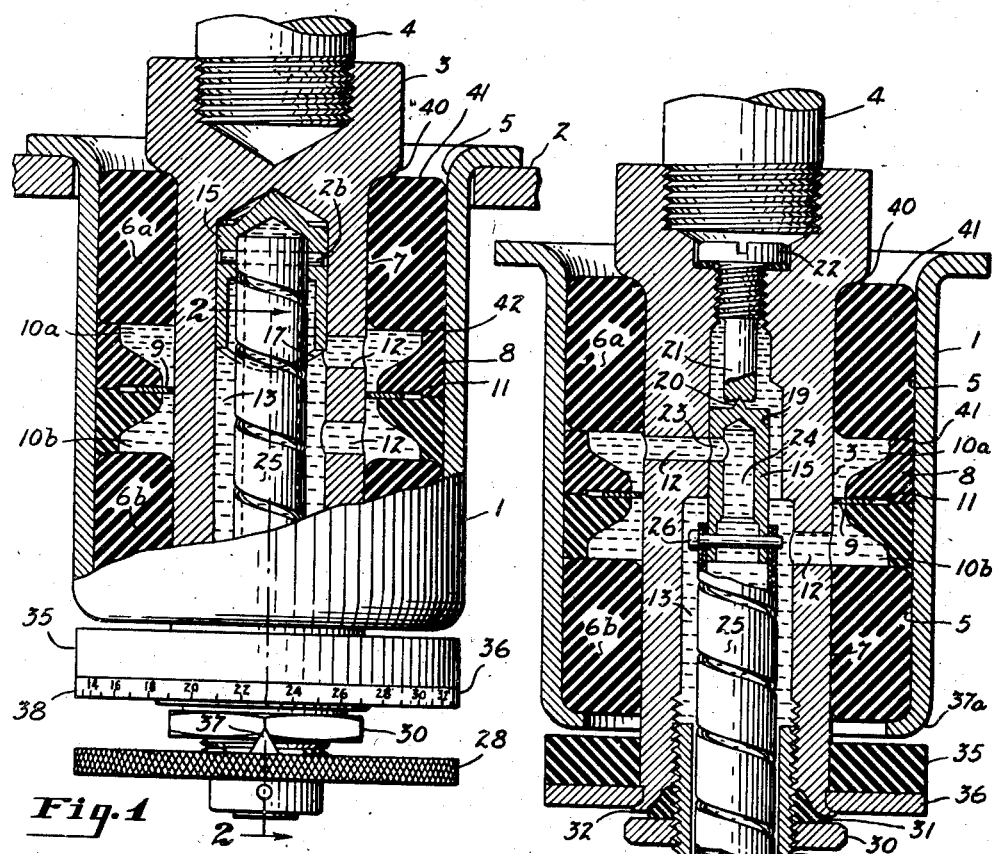
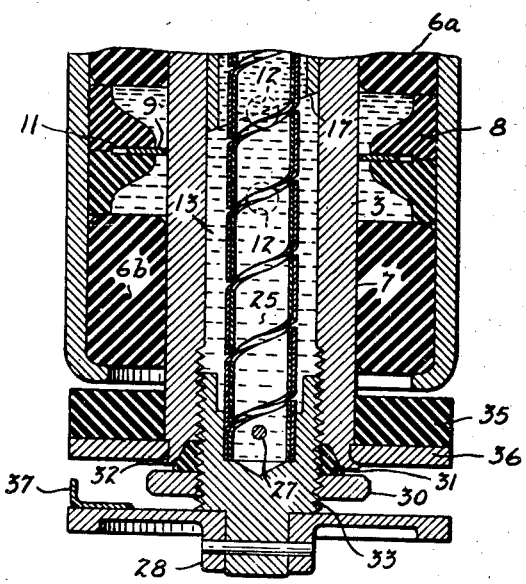
INVENTOR.
Leon F. Thiry
BY
Evans + McCoy
ATTORNEYS Patented Mar. 11, 1947

2,417,096

UNITED STATES PATENT OFFICE 2,417,096

FLUID-DAMPED MOUNTING

Leon F. Thiry, Montclair, N. J., assignor to The General Tire & Rubber Company, Akron, Ohio, a corporation of Ohio Application December 13, 1944, Serial No. 568,042

6 Claims. (Cl. 248—358)

This invention relates to vibration-absorbing mountings. It particularly relates to vibration-absorbing mountings which are adapted to absorb vibration by axial movement and which are provided with self-contained fluid-damping.

It is well-known that for greatest vibration insulation, the softest possible suspension or mountings having the greatest deflection per unit increase in load should be used. In commercial applications, the maximum desirable deflection is usually relatively limited, however. Therefore, to prevent great deflections it is frequently essential to provide either frictional or fluid-damping to absorb vibrational energy, particularly of vibrations having a frequency near that of the natural frequency of the vibrational system.

In my prior application Serial No. 509,584, filed November 9, 1943, of which this application is a continuation-in-part, I described mountings utilizing fluid-damping. While such mountings are satisfactory for many applications, it is frequently desirable to provide external means for adjusting the degree of damping for the particular mounting system and to provide means for compensating for temperature changes and particularly for the effects of temperature on the viscosity of the damping fluid.

It is, therefore, an object of the present invention to provide mountings having self-contained fluid-damping in which the degree of damping may be adjusted while the mounting is in use to provide the most desirable characteristics for the particular mounting system.

It is another object of the present invention to provide fluid-damped mountings in which the effect of temperature is automatically compensated.

It is a still further object of the present invention to provide a mounting having thermostatically controlled damping and in which the degree of damping may be adjusted by hand while the mounting is in use.

Other objects of the present invention will be apparent from the following detailed description of the invention as illustrated by the accompanying drawing, in which:

Figure 1 is an elevational view, with portions broken away of a mounting embodying the present invention, showing portions of the two relatively movable members to which the mounting is connected;

Fig. 2 is a sectional view on the line 2—2 of Fig. 1; and

Fig. 3 is a longitudinal sectional view through a modified form of mounting embodying the present invention.

Referring more particularly to the drawing, in which like parts are designated by like numerals of reference throughout the several views, mountings embodying the present invention comprise an outer, rigid housing 1. The housing 1 is preferably of tubular or cylindrical shape and is adapted to be connected to one of two or more relatively movable elements, such as a mounting member or frame 2. An inner rigid member 3, which is adapted to be connected to another of said relatively movable elements such as the mounted member 4, is disposed substantially coaxially within the tubular surface 5 of the housing. The inner rigid member 3 is carried within the housing by axially spaced, annular resilient members 6a and 6b, the outer peripheral surface of each of which bears against the inner tubular surface 5 of the housing 1, while the inner peripheral surface thereof bears against the outer substantially cylindrical surface 7 of the inner member 3.

One or both of the resilient members 6a and 6b are preferably under a relatively high state of radial compression between the outer surface of the inner member and an inner wall portion of the housing, as described in my Patent No. 1,782,770. The annular resilient members are in fluid-tight relation with the inner tubular walls of the housing 1 and the outer walls of the inner member 3, so that a fluid-retaining cavity defined by the housing, the spaced annular resilient members 6a and 6b, and the inner member 3 is had.

In accordance with the present invention, means such as a separator 8, which may be a portion of the housing, and a cooperating piston ring 9 are preferably provided for dividing the fluid-retaining cavity into two compartments 10a and 10b respectively adjacent the resilient members 6a and 6b. The piston ring 9 may be laterally slidable within a groove 11 to prevent binding of the inner member 3 thereon when it is subjected to lateral or non-axial deflection. The separator 8 preferably comprises two pieces for convenience in assembly.

A restricted passageway is provided between the compartments 10a and 10b to permit passage of incompressible fluid from one compartment to the other compartment as the inner member 3 is moved axially relative to the housing 1, with accompanying distortion of the resilient members 6a and 6b, so that the volume of compartment 10a is reduced and the volume of compartment 10b is increased, or vice versa. The passageway may comprise ports 12 laterally offset and opening into each of the respective compartments and a connecting bore 13 within the member 3. Means such as a rotatable or slidable plug 15 is journalled within the bore 13 of the member 3 and is provided for adjusting the minimum cross sectional area of portions of the passageway so that variations of the amount of restriction applied to the passage of fluid through the passageway may be had.

In the modification of Figure 1, the plug 15 is provided with a sloping end portion 17 so that the exposed opening into one of the ports 12 may be readily varied by changing its angular position. In the modification of Fig. 3, the plug 15, which is loosely carried within a restricted portion 19 of the bore 13 and which is pivoted at the point 20 on the extension 21 of the filler plug 22, has a port 23 which is suitably aligned with the port 12, permitting passage of liquid from the compartment 10a through one of the ports 12, the port 23, the bore 24 between the turns of the spirally wound bimetallic strip 25 to the bore 13 and the other port 12 into the compartment 10b.

In accordance with the present invention, means such as a bimetallic strip 25, which is connected on the one end by a pin 26 to the plug 15 and on the other end through the plug 27 to the adjusting head 28, is provided for varying the minimum cross sectional area of the passageway between the compartments 10a and 10b, preferably while the mounting is in use. Thus, ease of passage of the incompressible fluid within the compartments 10a and 10b may be varied in accordance with the dynamic properties of the system comprising the mounting, the mounted and the mounting members. Since the mounting head 28 is externally of the bushing, the fluid-damping may be adjusted under vibrating conditions to obtain the most desired results.

A lock nut 30 is provided to compress the sealing gasket 31 against the peripheral end portion 32 of the inner member 3 and against the threads 33 of the cap 28 to prevent leakage of liquid or fluid.

A small amount of gas, such as air, nitrogen, etc., may also be present within the fluid chamber to act as a cushion for sudden shocks. If desired, a bumper 35 of resilient material may be provided between the radially extending flange 36 carried by the end portion 32 of the inner member 3 and an end portion 37a of the housing 1 to effectively limit movement due to any excessive shocks.

The resilient material 6a and 6b and the bumper 35 of the mounting of the present invention may be of any rubberlike material, including compounds of natural rubber, neoprene, polyisoprene, polybutadiene or other synthetic rubbers such as the Buna rubbers, copolymers of butadiene or other conjugated diene with one or more other unsaturated materials such as styrene or halogenated styrenes, acrylonitrile, methyl methacrylate, or other acrylic or alkyl-substituted acrylic acid, ester or nitrile thereof, vinyl ketones, vinyl pyridine, certain rubbery condensation products of polybasic acids with polyhydric alcohols or organic polysulfides, such as Thiokol, and the like. Any vulcanizable rubberlike material may be used, but vulcanizable rubbers, particularly sulfur-vulcanizable rubbers or elastomers, are usually preferred.

It will be seen from the above that the mountings of the present invention utilize the absorption and insulation characteristics of rubber together with self-contained and adjustable fluid-damping. It is preferred that the fluid-damping be thermostatically controlled to counteract variations in viscosity of the usual damping liquids. However, when a liquid or liquid combination is used having a viscosity that remains substantially constant throughout the temperature range at which the mounting is to be used, the bimetallic strip 25 may of course be substituted by simple non-thermostatic connecting means so that after initial adjustment is made by hand the damping of the mounting remains substantially constant.

A pointer 37 together with an indicating scale 38 may if desired be provided for externally indicating the position of the plug 15 within the bore of the member 3, thus indicating the degree of restriction to the passage of fluid between the compartments 10a and 10b.

To change the load deflection characteristics of the mounting, the inner rigid member 3 may be provided with a cam portion 40 adjacent the free surface 41 of the resilient material 6a, so that for great deflections the effective thickness of the resilient material 6a is decreased and a stiffening effect is obtained. The housing or the rigid separator 8 thereof that divides the chamber may be provided with a locking portion 42 extending inwardly of the inner surface of the housing adjacent the opposite free surface of the annular resilient material 6a to decrease any tendency for relative slippage between the resilient member and the housing 1 at extreme loadings. Similar locking portions may be provided for the member 6b if desired.

It is also apparent that many modifications of the invention may be made without changing the spirit thereof, and it is intended that the invention be limited only by the appended claims.

What I claim is:

1. A vibration-absorbing mounting comprising a housing, which may be connected to one of two relatively movable elements, at least two laterally spaced, annular load-supporting resilient members within said housing, a rigid inner member substantially coaxial with said housing and carried by and extending substantially through both of said annular resilient members, said inner member being adapted to be connected to the other of said relatively movable elements, said inner member, said housing and said annular resilient members cooperatively forming a chamber containing liquid, rigid means for separating said chamber into at least two compartments, a passageway for permitting passage of said liquid between said compartments when one of the compartments is reduced in volume by relative movement of said inner member and said housing, and means for varying the cross sectional area of portions of said passageway to obtain a predetermined rate of flow of said liquid between said compartments, whereby the characteristics of the suspension between the two relatively movable elements may be varied.

2. A vibration-absorbing mounting for absorbing vibration between two relatively movable elements comprising a housing adapted to be rigidly connected to one of said relatively movable elements, a generally tubular portion, spaced annular resilient members within tubular portions of said housing and carried in fluid-tight relation with the walls thereof, a rigid inner member carried by both of said resilient members and being movable with respect to said housing by distortion of said resilient members, said inner member being adapted to be connected to the other of said relatively movable elements, said housing, said inner member and said resilient members defining a cavity adapted to receive and retain fluid, means for separating said cavity into two axially spaced compartments, and a passageway between said compartments, whereby axial deflection of said inner member relative to said housing causes change in volume of said compartments to cause flow of fluid from one compartment to the other.

3. A vibration-absorbing mounting comprising a housing which may be connected with one of two relatively movable elements, said housing having a generally tubular portion, a rigid inner member having a generally cylindrical portion carried in substantially coaxial relation within said housing, axially spaced, annular resilient members each disposed in fluid-tight relation with the inner wall of said housing and the outer wall of said inner member, at least one of said resilient members being under state of relatively high radial compression, said housing, said annular resilient members and said inner member cooperatively forming a chamber, rigid separating means separating said chamber into two compartments, a fluid passageway between said compartments, liquid in said compartments, and means for adjusting ease of fluid flow through said passageway, whereby characteristics of suspension between the two relatively movable elements may be varied.

4. A vibration-absorbing mounting comprising a housing which may be connected with one of two relatively movable elements, said housing having a generally tubular portion, a rigid inner member having a generally cylindrical portion carried in substantially coaxial relation within said housing, axially spaced, annular resilient members each disposed in fluid-tight relation with the inner wall of said housing and the outer wall of said inner member, at least one of said resilient members being under state of relatively high radial compression, said housing, said annular resilient members and said inner member cooperatively forming a chamber, rigid separating means separating said chamber into two compartments, a fluid passageway between said compartments, liquid in said compartments, means for adjusting the ease of fluid flow through said passageway, and thermostatic means for compensating for effects of temperature changes on the viscosity of said fluid, whereby the characteristics of suspension between two relatively movable elements may be varied and maintained at different temperatures.

5. A vibration-absorbing mounting comprising a housing which may be connected with one of two relatively movable elements, said housing having a generally tubular portion, a rigid inner member having a generally cylindrical portion carried in substantially coaxial relation within said housing, axially spaced, annular resilient members each disposed in fluid-tight relation with the inner wall of said housing and the outer wall of said inner member, both of said resilient members being under state of relatively high radial compression, said housing, said annular resilient members and said inner member cooperatively forming a chamber, rigid separating means separating said chamber into two compartments, a fluid passageway between said compartments, liquid in said compartments, and means for adjusting the ease of fluid flow through said passageway, whereby characteristics of suspension between the two relatively movable elements may be varied.

6. A vibration-absorbing mounting comprising a housing which may be connected with one of two relatively movable elements, said housing having a generally tubular portion, a rigid inner member having a generally cylindrical portion carried in substantially coaxial relation within said housing, axially spaced, annular resilient members each disposed in fluid-tight relation with the inner wall of said housing and the outer wall of said inner member, at least one of said resilient members being under state of relatively high radial compression, said housing, said annular resilient members and said inner member cooperatively forming a chamber, rigid separating means separating said chamber into two compartments, a fluid passageway between said compartments, liquid in said compartments, and means for adjusting ease of fluid flow through said passageway while said mounting is in use, whereby characteristics of suspension between the two relatively movable elements may be varied.

LEON F. THIRY.